United States Patent [19]

Kano et al.

[11] Patent Number: 4,801,756
[45] Date of Patent: Jan. 31, 1989

[54] LIQUID CRYSTAL COMPOUND

[75] Inventors: Mitsuru Kano, Furukawa; Jun Nakanowatari, Miyagi, both of Japan

[73] Assignee: Alps Electric Co., Ltd., Japan

[21] Appl. No.: 947,631

[22] Filed: Dec. 30, 1986

[30] Foreign Application Priority Data

Feb. 13, 1986 [JP] Japan .................. 61-29698

[51] Int. Cl.$^4$ ......................... G02F 1/13; C09K 19/12; C07C 43/02
[52] U.S. Cl. .................. 568/642; 252/299.01; 252/299.66; 350/350 R; 350/350 S; 350/349
[58] Field of Search ........... 252/299.5, 299.66, 299.01; 568/642; 350/349, 350 R, 350 S

[56] References Cited

U.S. PATENT DOCUMENTS 4,614,609  9/1986  Inoue et al. .................. 252/299.66

FOREIGN PATENT DOCUMENTS

| 136725 | 4/1985 | European Pat. Off. ....... 252/299.01 |
| 61-208030 | 9/1986 | Japan .................. 252/299.66 |
| 61-229833 | 10/1986 | Japan .................. 252/299.66 |
| 61-255988 | 11/1986 | Japan .................. 252/299.66 |

OTHER PUBLICATIONS

Demus, D. et al., Flüssige Kristalle in Tabellen, Veb Deutscher Verlag fur Grundstoffindustrie, Leipzig, p. 186 (1974).

Demus, D. et al., Flussige Kristalle in Tabellen II, Veb Deutscher Verlag fur Grundstoffindustrie, Leipzig, p. 270 (1984).

Gray, L. W. et al., Liquid Crystals & Plastic Crystals, vol. 1, John Wiley & Sons, NYC., N.Y., pp. 142-143 (1974).

Primary Examiner—Teddy S. Gron
Attorney, Agent, or Firm—Guy W. Shoup; Paul J. Winters

[57] ABSTRACT

There is provided a chiral compound of the formula

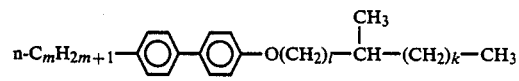

where m, l, and k are integers in the range of $4 \leq m \leq 14$, $0 \leq l \leq 7$, $0 \leq k \leq 8$, respectively, which has the property of being a liquid crystal in itself or can be added to a liquid crystal without any adverse effect on the liquid crystal. The compound induces twisted arrangement when added to a liquid crystal of TN mode or phase change mode, and it increases the spontaneous polarization when added to a SmC* liquid crystal.

3 Claims, No Drawings

LIQUID CRYSTAL COMPOUND

BACKGROUND OF THE INVENTION

1. Field of the Invention

The present invention relates to a liquid crystal compound to be used for liquid crystal elements. More particularly, it relates to a new chiral substance which induces the twisted arrangement of liquid crystal.

2. Description of the Prior Art

There are two known operating modes of liquid crystal display devices. One is the twisted nematic mode for nematic liquid crystals and the other is the phase change mode for cholesteric liquid crystals. In these modes, the liquid crystal is incorporated with a chiral substance which induces the twisted arrangement of liquid crystal. On the other hand, there is a high-speed optical switch attracting attention which utilizes smectic liquid crystal, particularly smectic C* (SmC*) liquid crystal, characterized by its twisted arrangement and also utilizes its ferroelectricity. The SmC* liquid crystal is a chiral substance in itself, or the SmC* crystal is incorporated with a chiral substance.

The chiral substance that induces the twisted arrangement is of vital importance to liquid crystal display elements. The chiral substance used for liquid crystal display elements should have the optical rotary power; but it is not all that is required. What is required for the chiral substance is that it has the properties of being liquid crystal in itself or it does not greatly impair the performance of liquid crystal when it is added to a liquid crystal.

However, there has been only a few chiral substances that meet the above-mentioned requirements.

SUMMARY OF THE INVENTION

It is an object of the present invention to provide a new liquid crystal compound that meets the above-mentioned requirements for a chiral substance.

To achieve the object of the invention, the present inventors carried out a series of researches which led to the finding that a compound represented by Formula I below has outstanding properties for a chiral substance. The present invention was completed on the basis of this finding.

According to this invention, there is provided a liquid crystal compound represented by Formula I below.

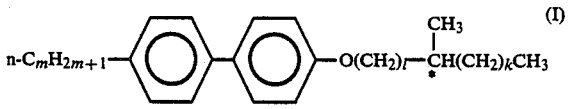

where m, l, and k are integers in the range of $4 \leq m \leq 14$, $0 \leq l \leq 7$, $1 \leq k \leq 8$, respectively. The asterisk (*) indicates an asymmetric carbon atom. This compound should be optically active.

DETAILED DESCRIPTION OF THE INVENTION

The compound represented by Formula I above has the following characteristic features. (a) The skeleton has the biphenyl structure characteristic of liquid crystal. (b) One of the terminal groups is a straight-chain alkyl group. (c) The other terminal group is an alkoxyl group having an asymmetric carbon atom indicated by an asterisk (*). The above-mentioned structures (a) and (b) are common to liquid crystal compounds and important to liquid crystal performance. The oxygen atom in the alkoxyl group mentioned in (c) contributes to the mutual action in the direction of the short axis of the molecule. The asymmetric carbon mentioned in (c) is important to the optical rotary power. It will be understood from the foregoing that the compound represented by Formula I meets the requirements for a chiral substance.

The compound of this invention represented by Formula I can be synthesized according to the following procedure.

(1) Synthesis of

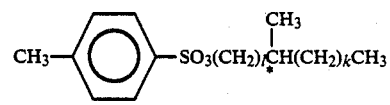

(p-toluenesulfonate ester)

At first, a compound of

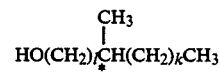

prepared in the usual way is reacted with commercial p-toluenesulfochloride in an equivalent amount in the presence of pyridine at a low temperature. The reaction product is extracted with benzene acidified with hydrochloric acid. After washing, benzene is distilled away to give the desired product.

(2) Synthesis of the compound represented by Formula I.

An equivalent of the compound prepared in (1) above is reacted with commercial

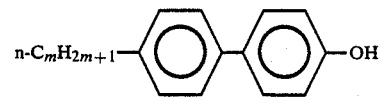

and potassium hydroxide in ethanol with heating. After removal of ethanol by distillation, the reaction product is dissolved in benzene. The solution is washed with an acid, with alkali, and finally with water. Benzene is distilled away. On recrystallization from ethanol, there is obtained the desired product.

The compound of Formula I synthesized as mentioned above meets the requirements for a chiral substance. Thus, it is used as a component of the liquid crystal mixture constituting the liquid crystal display units of TN mode and phase change mode. It is also used as a component of the SmC* liquid crystal mixture.

DESCRIPTION OF THE PREFERRED EMBODIMENTS

EXAMPLE 1

Synthesis of (+)-4'-dodecyl-4-5-methylheptyloxybiphenyl represented by Formula II below.

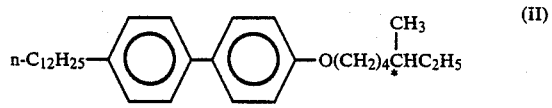

(1) A Grignard's reagent was prepared from commercial active amyl alcohol

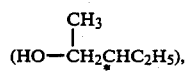

phosphorus tribromide, and metallic magnesium. The Grignard's reagent was reacted with trimethylene oxide to produce a compound represented by the formula

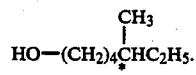

10 g of this compound was reacted with 18 g of p-toluenesulfochloride in 30 ml of pyridine for about 8 hours at 20° C. or below. The reaction product was added to 250 ml of 2N HCl, and the mixture was added to benzene to extract the desired product into the benzene layer. The benzene layer was washed with a saturated solution of sodium chloride, and benzene was distilled away. Thus there was obtained the desired product in a yield of 20 g.

(2) 10 g of the compound obtained in the above step (1), 10 g of

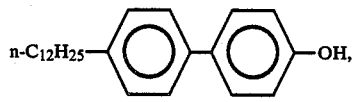

and 2.0 g of KOH were dissolved in 200 ml of ethanol. The solution was refluxed with stirring for about 48 hours. Ethanol as distilled away from the reaction liquid. The residues were dissolved in 500 ml of benzene and the solution was washed in the usual way. Benzene was distilled away, and the residues were recrystallized from ethanol. The yield was 10 g. The compound thus obtained was identified as the compound of Formula II above according to the results of IR, $^{13}$C—NMR, and liquid chromatography.

This compound undergoes phase change as follows:

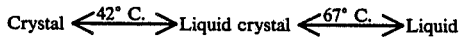

This compound has the angle of rotation $[\alpha]_D^{26}=+15°$ The compound was added in an amount of 1 wt% to a commercial biphenyl type liquid crystal, and the mixture was injected into the liquid crystal display cell of TN mode. The liquid crystal display element worked satisfactorily. The compound was also added in an amount of 2 to 3 wt% to the same liquid crystal as mentioned just above, and the mixture was injected into the liquid crystal display cell. There was obtained a liquid crystal display element of phase change mode of white tailor type.

EXAMPLE 2

(+)-4'-dodecyloxy-4-5-methylheptylbiphenyl represented by Formula III below

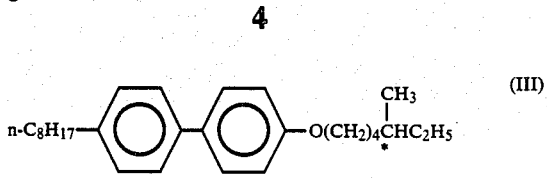

was prepared in the same manner as in Example 1, except that the compound of

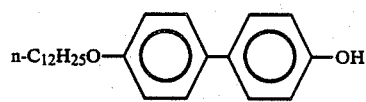

in step (2) was replaced by the compound of

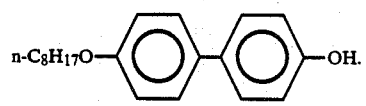

This compound undergoes phase change as follows:

This compound has the angle of rotation $[\alpha]_D^{26}=+13°$ The compound was added to the same liquid crystal as in Example 1 to produce a liquid crystal display element, which was as good as that in Example 1.

EXAMPLES 3 TO 6

Compounds of Formulas IV to VII below were produced in the same manner as in Example 1 exept that the compound derived from the active amyl alcohol was replaced by (−)-2-butanol or (+)-2-octanol.

EXAMPLE 3

(−)-4'-dodecyl-4-1-methylpropoxybiphenyl

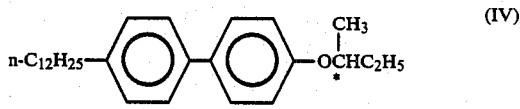

EXAMPLE 4

(−)-4'-octyl-4-1-methylpropoxybiphenyl

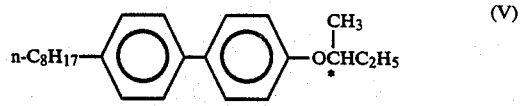

EXAMPLE 5

(+)-4'-dodecyl-4-1-methylheptyloxybiphenyl

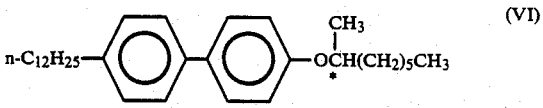

EXAMPLE 6

(+)-4'-octyl-4-1-methylheptyloxybiphenyl

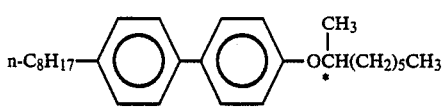
(VII)

These four compounds do not exhibit the liquid crystal phase; but they gave liquid crystal element when added to the liquid crystal in the same manner as in Example 1.

EXAMPLE 7

SmC* liquid crystal mixtures as shown in Table 1 were prepared. The one in Comparative Example 1 is a mixture of the compounds represented by Formulas A and B below.

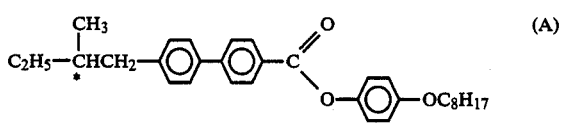
(A)

4'-(+)-amylbiphenylcarboxylic acid p-octyloxyphenol ester

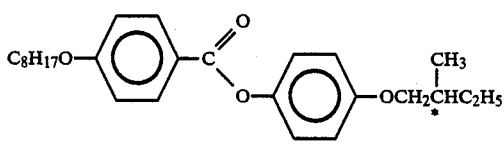
(B)

p-octyloxyphenylcarboxylic acid p'-acyloxyphenol ester

The one in Comparative Example 2 is a mixture of compounds A and B and a compound represented by Formula C below.

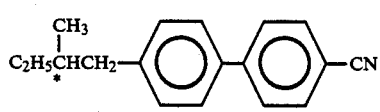
(C)

(+)-4'-amyl-4-cyanobiphenyl

The one in Example 7 is a mixture of compounds A and B and the compound of Formula VI obtained in Example 5.

TABLE 1

| | Composition | SmC* temp. range | Ps (nc/cm$^2$) |
|---|---|---|---|
| Comparative Example 1 | A:B = 40:60 | +10 to +60° C. | 1.5 |
| Comparative Example 2 | A:B = 40:60 + C(5%) | +5 to +20° C. | 1.5 |
| Example 7 | A:B = 40:60 + VI(5%) | +15 to +45° C. | 10 |

The liquid crystal mixtures thus obtained had the SmC* temperature range and the spontaneous polarization (Ps) value as shown in Table 1. It is noted that the compound of Formula VI obtained in Example 5 produced a pronounced effect in the increase of Ps. This means that the compound greatly improves the characteristic property important to the SmC* liquid crystal. Incidentally, it was confirmed that the compounds of Formulas II to V and VII are also effective in increasing Ps.

As mentioned above, the present invention has the following effect. The compound of this invention has the property of being a liquid crystal in itself or can be added to a liquid crystal without any adverse effect on the liquid crystal. In addition, it has a high optical rotary power. Thus the invention provides a superior chiral liquid crystal compound. The compound induces twisted arrangement when added to a liquid crystal of TN mode or phase change mode. In addition, it increases the spontaneous polarization, which is an index of ferroelectricity, when added to an SmC* liquid crystal.

What is claimed is:

1. A liquid crystal compound represented by Formula I below:

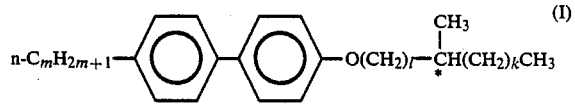
(I)

where m, l, and k are integers in the range of $4 \leq m \leq 14$, $0 \leq l \leq 7$, $1 \leq k \leq 8$, respectively, excluding the case where l=1 and k=1, the asterisk (*) indicates an asymmetric carbon atom, and the compound should be optically active.

2. A liquid crystal compound according to claim 1, wherein m=8 or 12, l=4 or 0, and k=1.

3. A liquid crystal compound according to claim 1, wherein m=8 or 12, l=0, and k=5.

* * * * *